United States Patent [19]
Svahn et al.

[11] 3,960,359
[45] June 1, 1976

[54] STRETCHING SCREW

[75] Inventors: Bo Knut Lennart Svahn, Partille; Lars Gustav Vilhelm Wersén, Goteborg, both of Sweden

[73] Assignee: J. Mustad AB, Sweden

[22] Filed: Feb. 1, 1974

[21] Appl. No.: 438,764

[30] Foreign Application Priority Data
July 11, 1973 Sweden .............................. 7309714

[52] U.S. Cl. ................................. 254/67; 403/43
[51] Int. Cl.² ...................... B66F 3/08; F16B 7/06; F16G 11/12
[58] Field of Search ............. 254/54, 67; 403/43–48

[56] References Cited
UNITED STATES PATENTS

| | | | |
|---|---|---|---|
| 1,373,230 | 3/1921 | Gainor | 254/67 |
| 1,494,170 | 5/1924 | Kearney | 254/67 |
| 1,686.501 | 10/1928 | Hart | 254/67 |
| 2,538,757 | 1/1951 | Bratthauer et al. | 403/43 |

FOREIGN PATENTS OR APPLICATIONS

| | | | |
|---|---|---|---|
| 528,216 | 6/1931 | Germany | 254/67 |

Primary Examiner—Othell M. Simpson
Attorney, Agent, or Firm—Robert E. Burns; Emmanuel J. Lobato; Bruce L. Adams

[57] ABSTRACT

A stretching screw comprising two attachment sections arranged for displacement relative one another and having a stop means arranged in the second attachment section so as to prevent turning movements of said second attachment section relative to said first attachment section upon displacement of said sections relative to one another. The stretching screw is self-locking and may be easily adjusted with one hand with the aid of e.g. a spanner.

1 Claim, 7 Drawing Figures

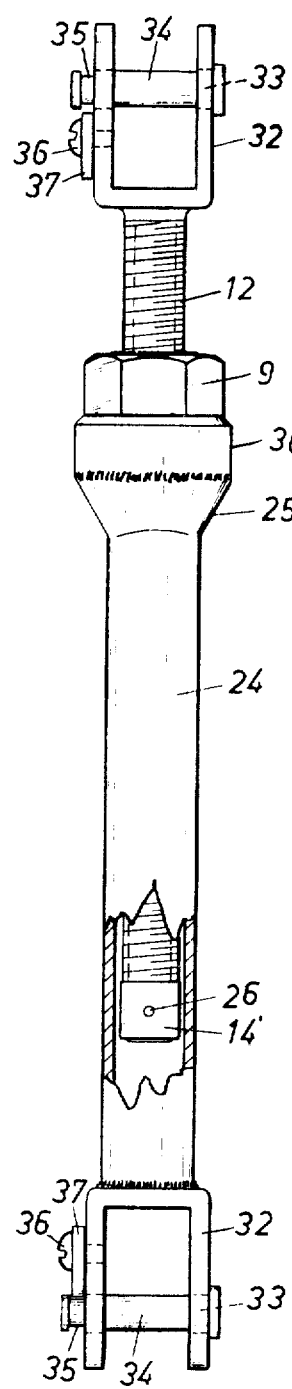
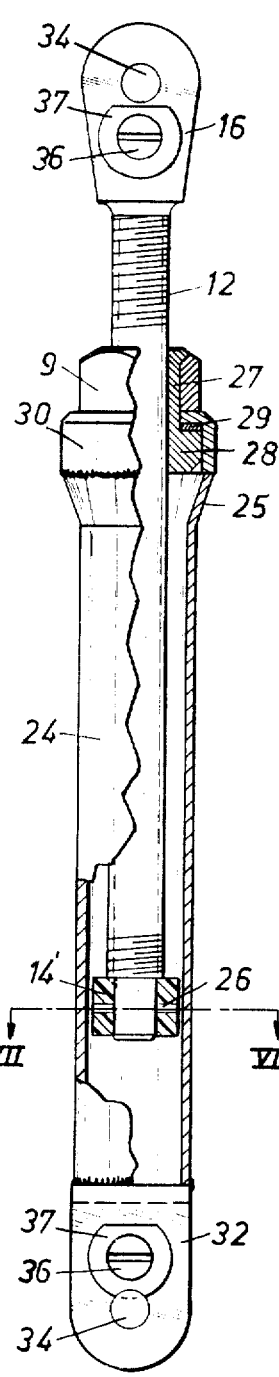
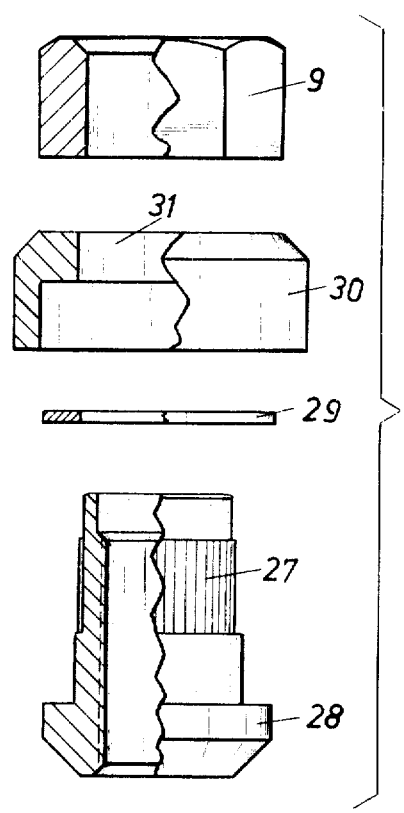
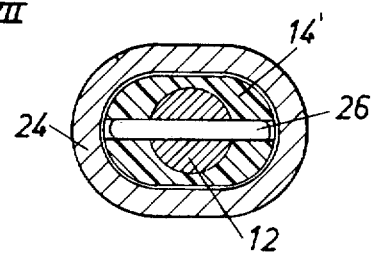

STRETCHING SCREW

BACKGROUND OF THE INVENTION

The present invention concerns a turnbuckle, also called a stretching screw comprising two attachment sections which are arranged for displacement relative one another by means of a threaded element. The latter is rotatably mounted in one of the attachment sections and a threaded hole passes through it, said hole having a threaded portion for securement to the second attachment section.

Some prior art stretching screws are provided with stop means arranged to prevent the attachment sections from turning relative to one another after completion of adjustment. In order to be able to adjust a stretching screw of this kind it is thus necessary to remove the stop means. The adjustment operation is further complicated in that it is necessary to keep both attachment sections in position during the adjustment operation proper.

SUMMARY OF THE PRESENT INVENTION

In accordance with the present invention a turnbuckle or stretching screw is provided with self-locking stop means. The new device in addition obviates the problem of the former sections which had to be secured during the adjustment operation. The invention is for this purpose characterised in that one of the attachment sections is provided with a stop means arranged upon displacement of the attachement sections relative to one another to prevent turning motion of the second section relative to the first section.

A stretching screw in accordance with the present invention is a great deal more simple to operate and handle than hitherto known stretching screws, particularly at sea where it is often necessary to work under severe and difficult conditions.

BRIEF DESCRIPTION OF THE DRAWINGS

Various embodiments of the invention will be described more in detail in the following and explained with reference to the accompanying drawings wherein.

FIG. 4 is a partly broken front view of the stretching screw in accordance with a preferred embodiment of the invention.

FIG. 5 is a partly broken side view of the stretching screw in accordance with FIG. 4.

FIG. 6 illustrates, partly in section, the various details of the adjustment means, according to FIGS. 4 and 5, and FIG. 7 is a sectional view along line VII—VII of FIG. 5.

DETAILED DESCRIPTION OF PREFERRED EMBODIMENTS

Figure 1:
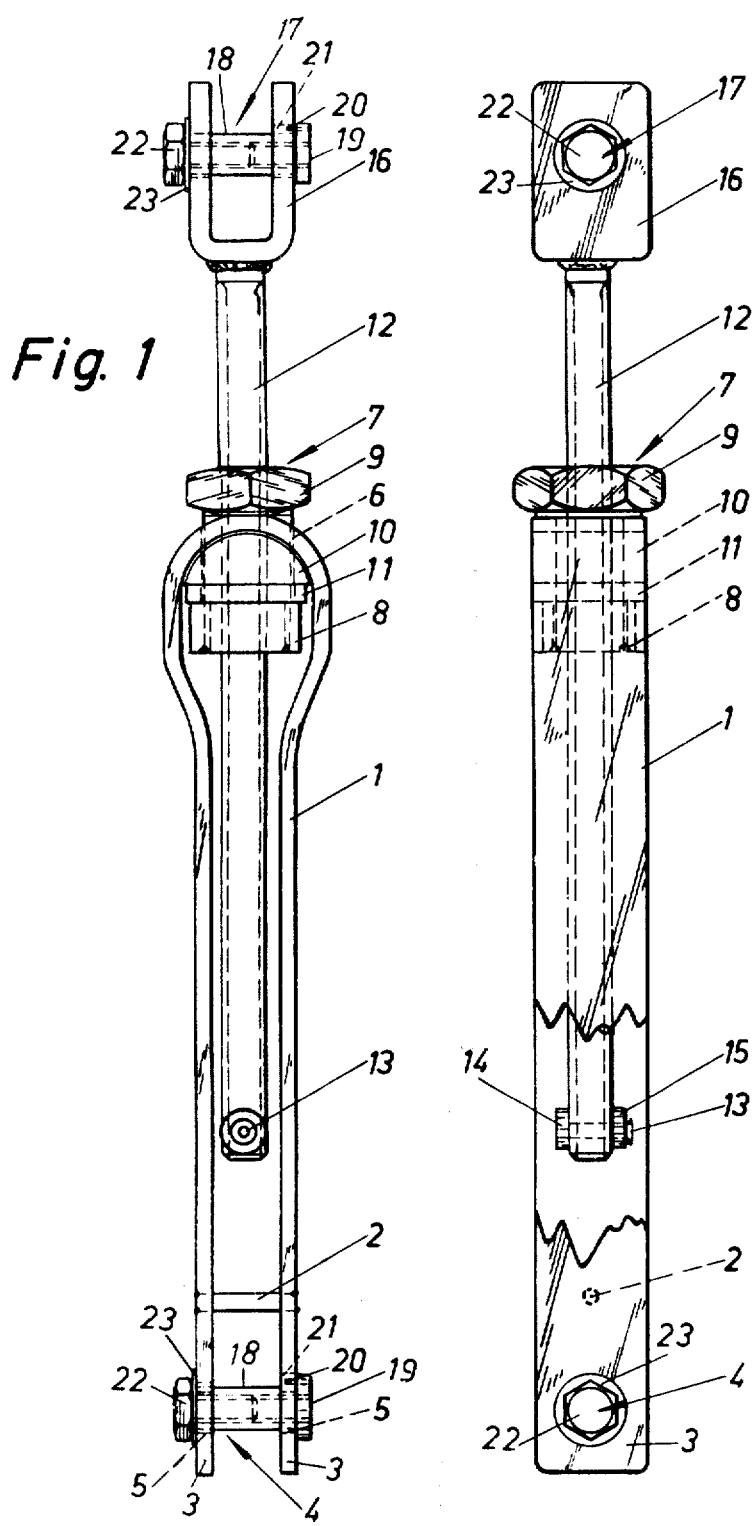
FIG. 1 is a front view of a stretching screw showing the principle of the invention.
Figure 2:
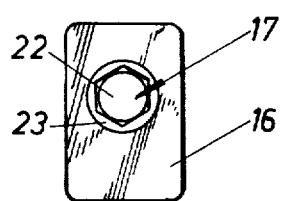
FIG. 2 is a partly broken side view of the stretching screw in accordance with FIG. 1.
Figure 3:
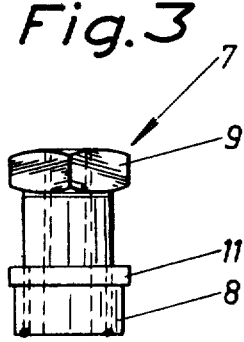
FIG. 3 illustrates the adjustment means of this stretching screw in detail.

The turnbuckle illustrated in FIGS. 1 – 3 comprises a flat iron 1 which has been folded over at its middle in such a manner that the two iron halves thus formed by the folding run in parallel spaced a certain distance apart. To fix this distance between the iron halves a distance piece 2 is provided between them. At the extreme ends of the halves is provided a first attachment bolt 4 to which a wire or similar means may be secured, said bolt passing through bolt holes 5 formed in the flat iron 1. In the centre of the bent portion at the middle of the flat iron 1 a sleeve 7 extends through a further hole 6 in the flat iron 1, said sleeve 7 being provided at its end positioned intermediate the flat iron halves with a radial flange 8 and at its opposite end with a nut ring 9 in accordance with the embodiment illustrated. The sleeve 7 is provided with internal threads. Intermediate the flange 8 and the inner face of the flat iron 1 a contact disc 10 is arranged and a friction plate 11 is positioned intermediate the contact disc 10 and the flange 8.

Into the sleeve 7 is screwed a threaded pin 12 having at its end positioned intermediate the flat iron halves a locking key or peg 13 which extends across the pin, the head 14 and locking end 15 of the locking key preferably having the same diameter as the pin 12. The length of the key 13 exceeds the distance separating the two halves of the flat iron 1 such that the pin 12 cannot turn relative to the flat iron. To minimize play between the flat iron interior face and the key the flat iron preferably is formed in such a way that the distance separating the iron halves by an insignificant amount exceeds the diameter of the pin 12 except at the mounting point of the sleeve 7 where slightly more space is required. The free end of the pin 12 is in the usual manner provided with a U-shaped loop 16 through the legs of which a second attachment bolt 17 passes in bolt holes 5.

The attachment bolts 4 and 17 consist of an internally threaded sleeve 18 which is provided with a flange 19 at one end and has a locking pin or dowel 20 arranged at the flange periphery, said locking dowel engaging in a recess 21 located at the periphery of the associated hole 5, and of a hexagon bolt 22 screwed into the sleeve. The locking dowel 20 prevents the sleeve from turning in its holes 5 for which reason no counteracting force is needed to tighten the bolt 22, which is a considerable advantage in cases when the operator has only one hand free to work with. Onto the bolt 22 is threaded a washer 23 to lock the bolt after tighthening.

To adjust the stretching screw the sleeve 7 is turned with the aid of a spanner or the like, whereupon the pin 12, without being turned relative to the flat iron 1, is displaced in parallel with the flat iron. When the adjustment is completed, the stretching screw need not be locked as the tensional force exerted between the attachment sections retains the flange 8 of the sleeve 7 tightly pressed against the friction plate 11 which cannot turn inside the flat iron. As a result hereof the sleeve 7 cannot change position either, except by means of external manual actuation.

In accordance with the embodiment illustrated in FIGS. 4–7 the stretching screw comprises a non-round, preferably oval tube 24 which has been flanged at one end 25. At this end the threaded pin 12 coaxial with tube 24 is inserted presenting at its end positioned inside the tube 24 a stop means in the form of an oval body 14'. The cross-sectional size of the oval body 14' agrees essentially with the cross section of the tube 24 and the oval body is secured to the pin 12 by means of a pin 26 extending through an aperture in the pin 12 and the body 14'. The stop means may also be in the form of an oval washer welded to the pin 12.

An internally threaded element 27 is arranged on the pin 12, said element having a flange 28 at one of its ends. A washer 29 is arranged around the narrow section of the element 27 in engagement with the flange 28. The threaded element 27 and the washer 29 are mounted for rotation in a socket 30 in which an aperture 31 is provided. The axial extension of the socket 30 is less that of the threaded element 27 and the socket is secured to the flanged end 25 of the tube 24 by means of welding. Onto the portion of the threaded element 27 which extends out through the aperture 31 of the socket 30 a nut ring 9 is arranged, preferably secured thereto by press fit. The nut ring 9 may also be welded to the threaded element 27.

The advantage of this embodiment is that it provides a stretching screw having an attachment section which is easy to manufacture. The manufacture of a stretching screw of this kind is carried out in the following manner. A tube length is upset in a press so as to receive an oval cross-sectional shape and is then flanged at its one end 25. The threaded element 27 is arranged in the socket 30 together with its intermediate washer 29 and is screwed onto the pin 12. The latter is provided with the stop means 14' and inserted into the tube 24, whereafter the socket 30 is welded onto the tube flange 25. Finally, the nut ring 9 is mounted.

A U-shaped loop 32 is welded onto the free end of the tube 24, a generally cylindrical attachment bolt 34 passing through bolt holes 33 formed in the loop legs. On the outer face of the loop 32 the bolt presents at one side a flat recess 35 in which engages a locking washer 37, said washer being attached to a screw 36. The locking washer shape is irregular and preferably it is formed from a round disc having a bevelled segment. The washer 37 may be pushed out of its engagement in the recess 35 when the screw 36 is slightly loosened and the washer turned until its bevelled segment or edge is positioned exactly opposite the recess. The washer 37 may also have a shape differing from the one described, such as e.g. a polygonal shape with irregular sides.

The invention is not limited to the embodiment described and explained above but various modifications are possible within the scope of the appended claims. For instance, the tube 24 may be upset so as to take on a shape other than oval.

What we claim is:

1. A turnbuckle comprising a first attachment section which comprises a tube having a non-round cross-sectional configuration;

a second attachment section;

a threaded element disposed to enable displacing said sections relative to said element and thereby relative to one another, said threaded element being rotationally mounted in said first attachment section and having a threaded aperture passing through said threaded element, said second attachment section having a threaded portion engaged in said threaded aperture;

stop means on said second attachment section for preventing turning movement of said second attachment section relative to said first attachment section upon displacement of said first and said second attachment sections relative to one another, said stop means having a length essentially agreeing with a maximum internal width dimension of said tube; and a U-shaped loop on an end of said tube, said loop having legs and having apertures across the legs of said loop;

a bolt passing through said apertures and having a free, generally cylindrical end portion with a flat recess thereon;

a non-round locking disc, and a screw securing said locking disc to said U-shaped loop adjacent said bolt, said locking disc engaging said recess on said bolt, said locking disc being turnable around said screw and displaceable from its engagement with said recess upon loosening of said screw.

* * * * *